United States Patent [19]
Harel et al.

[11] Patent Number: 6,128,472
[45] Date of Patent: Oct. 3, 2000

[54] EXPANDING A TWO-WAY PAGING SYSTEM FOR HIGH INBOUND TRAFFIC FROM STATIONARY SITES

[75] Inventors: Haim Harel, Palo Alto, Calif.; Anthony J. Weiss, Tel Aviv; Yair Karmi, RishonmLezion, both of Israel; Ilan Zorman, Palo Alto, Calif.

[73] Assignee: Wireless Online, Inc., Los Altos, Calif.

[21] Appl. No.: 09/094,922

[22] Filed: Jun. 15, 1998

[51] Int. Cl.$^7$ ................................................. H04Q 7/20
[52] U.S. Cl. .................... 455/31.3; 455/502; 455/526
[58] Field of Search ................................ 455/31.2, 31.3, 455/412, 500, 501–503, 514, 526, 561, 9, 15, 16; 340/825.44, 825.47; 370/310, 313, 345, 442–43

[56] References Cited

U.S. PATENT DOCUMENTS

| | | | |
|---|---|---|---|
| 4,875,038 | 10/1989 | Siwiak et al. | 455/31.3 |
| 4,882,588 | 11/1989 | Renshaw et al. | |
| 5,448,751 | 9/1995 | Takenka et al. | |
| 5,530,437 | 6/1996 | Goldberg | 340/825.08 |
| 5,596,318 | 1/1997 | Mitchell | 340/825.44 |
| 5,648,784 | 7/1997 | Ruiz et al. | |
| 5,734,963 | 3/1998 | Fitzgerald et al. | 455/31.2 |
| 5,760,705 | 6/1998 | Glessner et al. | 340/825.44 |
| 5,870,426 | 2/1999 | Yokev et al. | 340/825.44 X |
| 5,883,886 | 3/1999 | Eaton et al. | 455/31.3 X |

OTHER PUBLICATIONS

Balanis, C.A., in: Antenna Theory, Analysis and Design, Harper and Row, Inc., pp. 679–685 and 698–699 (1982).

Mailloux, R.J., in: Phase Array Antenna Handbook, Artech House, Inc., pp. 13–20, 438–445, and 521–524 (1994).

Motorola, Inc. Semiconductor Technical Data, FLEXchip Signal Processor, Publication No. MC68175/D 109 pages (1996).

Motorola, Inc. FLEXstack One Way Software Development Kit, Version 2.0 66 pages (Dec. 13, 1996).

Motorola, Inc. Flexible High Speed Paging Protocol Benchmarking, 16 pages (Apr. 26, 1994).

Motorola, Inc. FLEX Protocol's Operational Capabilities for Local, Regional, Nationwide and Global Roaming—Preliminary, 32 pages (Jul. 18, 1995).

Motorola, Inc., Typical FLEX Pager Blcok Diagram with FLEXstack, 1 page (Mar. 27, 1997) www.mot.com/SPS/DSP/flexchip/.

Texas Instruments TMS320FELX1 Chipset Product Brief, 3 pages (Mar. 27, 1997) www.ti.com/sc/docs/ wireless/page-.htm.

Texas Instruments Press Release, "TI Chip Set Supporting FLEX Messaging Protocol Now Available" 2 pages (Nov. 11, 1996) www.ti.com/sc/docs/news/1996/96070.htm.

Texas Instruments TLV5591 Data Manual for FLEX Decoder, Appendix A and B, 22 pages (Apr. 17, 1996).

*Primary Examiner*—William G. Trost
*Attorney, Agent, or Firm*—Townsend and Townsend and Crew LLP; Kenneth R. Allen

[57] ABSTRACT

A system and method for expanding high inbound message traffic in a two-way pager network. The network includes a central base station which receives inbound messages from a plurality of subscriber units via a plurality of receiver base stations, and wherein a central base station controller is adapted for receiving only one inbound message from a subscriber during each inbound transmission time slot. Inbound message capacity is expanded by providing a message management system between the receivers and the central base station controller. Subscribers are selectively grouped into a multicast group for simultaneously transmitting messages to the message management system, the simultaneously transmitted messages making up a multicast message group. The message management system receives the multicast message group, directs exactly one selected message of the multicast message group to the central base station controller, and diverts the remaining messages to a multicast processor.

15 Claims, 5 Drawing Sheets

EXPANDING A TWO-WAY PAGING SYSTEM FOR HIGH INBOUND TRAFFIC FROM STATIONARY SITES

STATEMENT OF RELATED APPLICATIONS

The present application relates to the subject matter of six coassigned applications: VERSATILE ANTENNA ARRAY FOR MULTIPLE PENCIL BEAMS AND EFFICIENT BEAM COMBINATION, application Ser. No. 08/808,347, filed on Feb. 24, 1997, U.S. Pat. No. 5,784,031; MULTI-CHANNEL MULTI-BEAM ENCODING SYSTEM, application Ser. No. 08/861,455, filed on May 22, 1997, U.S. Pat. No. 5,953,639; METHOD AND APPARATUS FOR ADAPTING OMNIDIRECTIONAL SYNCHRONOUS WIRELESS COMMUNICATIONS PROTOCOL TO SECTORIAL ENVIRONMENTS, application Ser. No. 08/861,458, filed on May 22, 1997, U.S. Pat. No. 5,953,621; IMPROVED TWO-WAY PAGING UPLINK INFRASTRUCTURE, application Ser. No. 08/915479, filed on Aug. 19, 1997; CONFLICT RESOLUTION IN A MULTI-BEAM MULTI-SITE PAGING SYSTEM, application Ser. No. 08/971,596, filed on Nov. 17, 1997, U.S. Pat. No. 6,016,421; and POWER CONTROL IN TWO-WAY PAGING SYSTEMS, application Ser. No. 09/041,808, filed on Mar. 13, 1998. The contents of these co-assigned applications are herein incorporated by reference for all purposes.

BACKGROUND OF THE INVENTION

The present invention is directed to a two-way messaging system, and more particularly to a system and method for expanding the capacity of a paging system for receiving high inbound-traffic from stationary pager sites.

Prior art two-way pager networks support multiple subscriber units (SUs) with both outbound messages to the SUs and inbound messages from the SUs to a network base station. In a standard ReFLEX$_{TM}$-based system, a two-way pager protocol promulgated by Motorola, Inc. of Schaumberg, Ill., the inbound traffic consists primarily of acknowledgments and short menu-based routine messages. Standard ReFLEX$_{TM}$ systems primarily support low power mobile subscriber units with heavy outbound traffic and only light inbound traffic.

There exists a need to support a two-way pager network having a large number of mostly stationary SUs, whose message requirements are directed to heavier inbound communications traffic. An application of this sort may include a fixed-site SU for sending frequent status reports paging messages, such as with a vending machine, credit card verification system, meter reading, etc. One example of this application is connecting an SU to a vending machine to transmit, upon request, the status of various vending parameters (number of cookies remaining, coins accumulated, last service date, etc.).

Figure 1:
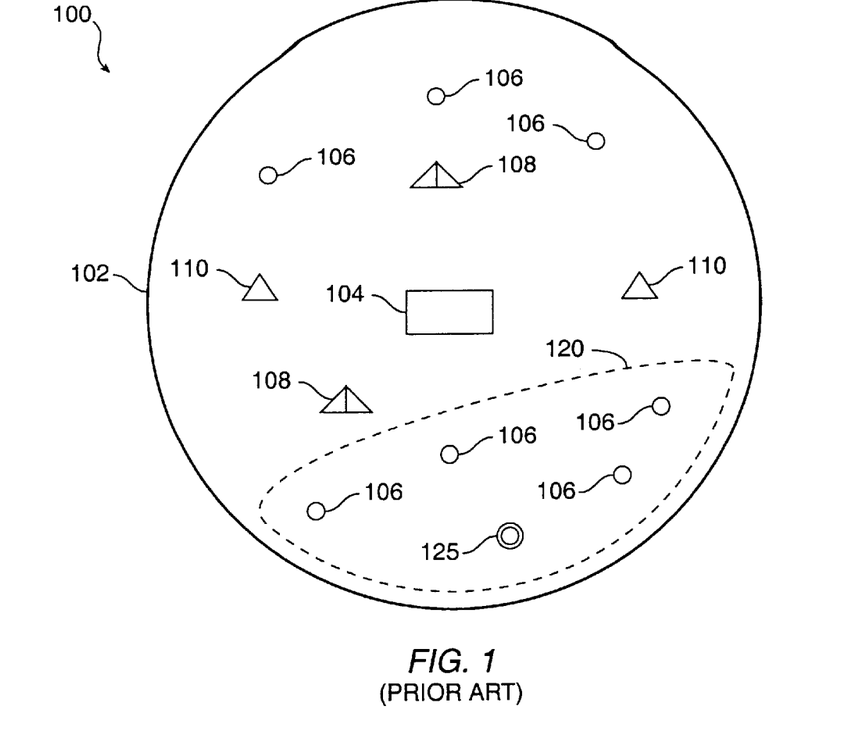
FIG. 1 depicts a prior art two-way pager system infrastructure.

FIG. 1 depicts a prior art two-way pager system infrastructure. FIG. 1 depicts elements of a two-way pager network 100 operating within a geographical region 102. A central base station 104 sends messages to individual two-way SUs 106 within region 102 via transmit/receive (TX/RX) sites 108. A simultaneous outbound transmission to more than one SU 106 is known as a simulcast, and the receiving SUs are within a region 102 known as a simulcast area. In response, individual SUs 106 send inbound messages to the central base station 104, received and forwarded by either the TX/RX sites 108 or a plurality of receive-only (RX-only) sites 110. Each of the TX/RX sites and RX-only sites are known as a base station for purposes of the present application. The central base station 104 includes a central receiver and switching center, to which all messages are forwarded. The additional RX sites 110 are required when the transmission coverage area of the TX/RX sites 108 exceeds the reception coverage area.

Figure 2:
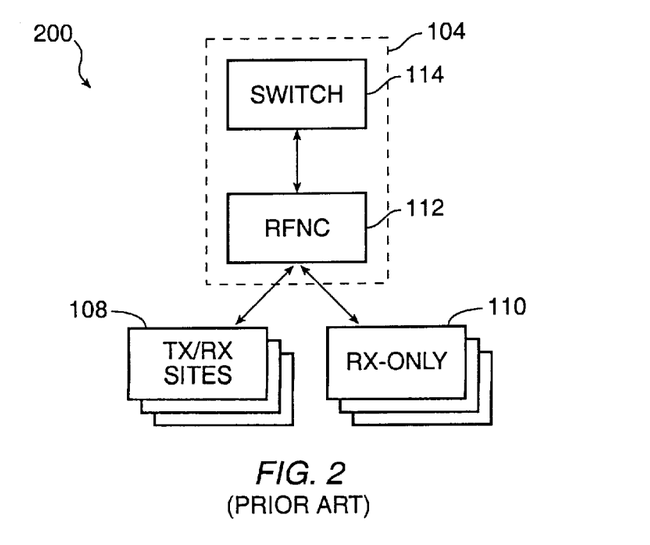
FIG. 2 depicts a block diagram of a prior art base station network of the two-way pager system adapted to receive inbound messages from multiple subscriber units.

FIG. 2 depicts a block diagram of a prior art base station network 200 of the two-way pager network 100. As described above, central base station 104 receives inbound messages from multiple SUs (not shown) via TX/RX sites 108 and RX sites 110, which are base stations hereafter collectively referred to as "receivers." The central base station 104 further includes a message switching center ("switch") 114 and an RF network controller, herein referred to as a central base station controller 112.

The central base station controller 112 schedules inbound and outbound messages according to requirements obtained from the switch 114 and from the SUs 106. Inbound transmissions are divided among scheduled and unscheduled inbound transmission time slots. Each SU 106 is assigned a unique identifier address which, being transmitted along with each SU's 106 inbound transmission, associates an inbound message to a specific SU 106. In prior art two-way pager networks 100, including the standard ReFLEX$_{TM}$ system, no more than one SU 106 is scheduled for transmission in any area 102 during any given scheduled transmission time slot. This is primarily caused by the radio equipment in prior art networks, composed of an omnidirectional antenna and a single receiver 108 or 110, not being able to decode more than a single message at a time. This is also due in part due to functional limitations of the central base station controller 112, which, in a given simulcast area 102, can receive only one inbound message per time slot.

A two-way pager network developed by Wireless Online, Inc., the assignee of the present application, employs a multibeam antenna having a receiving channel associated with each beam. This equipment allows for simultaneous reception of an SU message on each channel. However, without the benefits of the embodiments of the present invention herein described, the central base station of two-way pager networks will not be able to support multiple simultaneous inbound SU messages.

There is thus a need for a system and method for expanding the inbound message capacity of a two-way pager system 100 to support simultaneous transmissions from multiple SUs 106. The system must also support fixed-site SUs having status-report transmission requirements. Additionally, the system and method must support high inbound capacity without affecting the existing architecture of standard two-way pager networks 100, including ReFLEX$_{TM}$ systems.

SUMMARY OF THE INVENTION

The present invention provides a system and method for expanding high inbound message traffic in a two-way pager network. The network includes a base station which receives simultaneous inbound messages from a plurality of SUs via a plurality of receiver sites, and where a central base station controller is adapted for receiving only one inbound message from a selected SU during each inbound transmission time slot.

In accordance with a first aspect of the present invention, a method for increasing inbound message traffic to the base station includes the steps of: providing a message management system between the plurality of receiver sites and the central base station controller; grouping selected ones of the plurality of SUs into a multicast group for simultaneously transmitting messages to the message management system, the simultaneously transmitted messages making up a multicast message group; receiving, at the plurality of receivers sites coupled to the message management system, the simultaneously transmitted messages of said multicast message group; directing exactly one selected message of the multicast message group to the central base station controller; and diverting the remaining messages of the multicast message group to a multicast processor.

In accordance with a second aspect of the present invention, a message management system, operably coupled between the plurality of receiver sites and the central base station controller, for increasing inbound message traffic includes: a message concentrator to group selected ones the plurality of SUs into a multicast group for simultaneously transmitting messages, the simultaneously transmitting messages making up a multicast message group; a receiver channel to receive the multicast message group; a message manager to direct exactly one selected message of the multicast message group to the central base station controller; and a message processor to receive the remaining messages of the multicast group.

A further understanding of the nature and advantages of the inventions herein may be realized by reference to the remaining portions of the specification and the attached drawings.

DESCRIPTION OF THE SPECIFIC EMBODIMENTS

Figure 3:
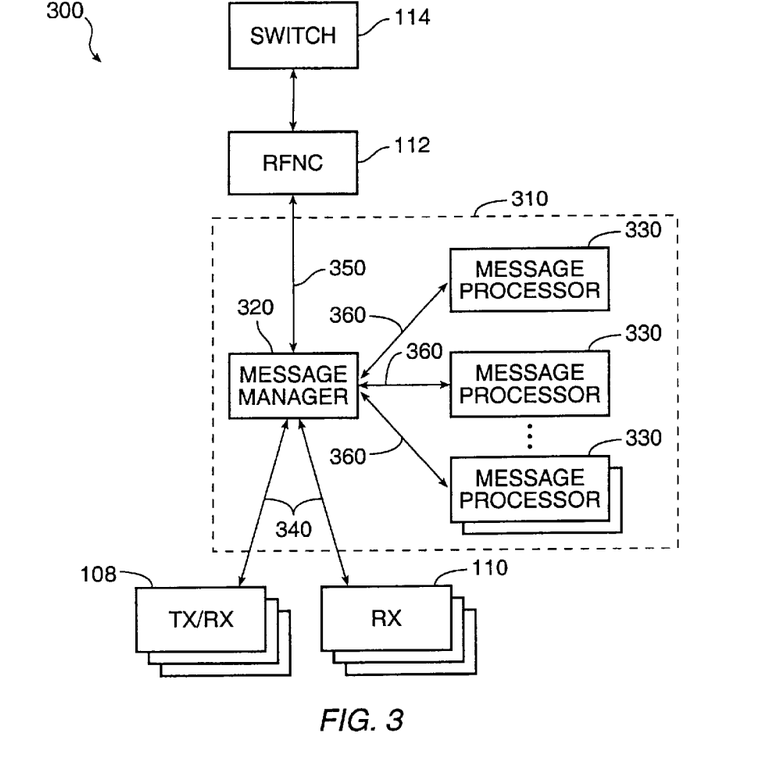
FIG. 3 depicts a block diagram of a base station network having a message management system to increase inbound message traffic in accordance with one embodiment of the present invention.

FIG. 3 depicts a block diagram of a base station network having a message management system to increase inbound message traffic in accordance with one embodiment of the present invention. FIG. 3 depicts a base station network 300 of a two-way pager system, having a message management system 310 operably coupled between the central base station controller 112 and the receivers 108 and 110. The message management system includes a message manager 320 and at least one message processor 330, and increases inbound message capacity to the base station 300 where the central base station controller 112 has a capacity for receiving only one inbound message from an SU during each time slot.

A user operating the message management system 310, or otherwise an end-user of inbound transmission information from the plurality of SUs 106, may take measurement of the SUs within a particular simulcast area 102. Based on such measurement, the SUs may be grouped into a unit within which each unit's SU may transmit simultaneously without mutual interference. Such a unit is identified herein as a "multicast group." FIG. 1 depicts a group of SUs 106 making up a multicast group 120.

Each SU 106 in the multicast group 120 is assigned a common identifier address to associate the SU with a particular multicast group. The identifier may be provided in the content of the messages sent by each SU 106, or alternatively, based on the existing protocol identification scheme, such as a FLEX$_{TM}$ address. When each SU 106 in the multicast group 120 is addressed an inbound transmission, it responds by transmitting, disregarding other SUs 106 in the multicast group 120. High inbound capacity is achieved by commanding, via the common address, all SUs within a multicast group to transmit an inbound message simultaneously, as part of a multicast message group.

The message manager 320 intercepts the inbound messages received from the receivers 108 and 110, which in turn receive the messages from the plurality of SUs 106. The message manager 320 communicates to both the central base station controller 112 and the receivers 108 and 110 using a standard paging protocol, such as the Motorola-Glenayre Inbound Paging Protocol (IPP). The role of the message manager 320 is to prevent more than one message from reaching the central base station controller 112 per time slot.

The message manager 320 includes a computer processor and a computer-readable medium. The message manager 320 may be preprogrammed with a stored list of multicast group common identifiers. Inbound messages not belonging to one of the multicast groups on the list are passed unmodified to the central base station controller 112. Messages having an identifier address corresponding to the list are decoded for further processing. The message manager will direct exactly one selected message from the multicast message group to the central base station controller 112; the remaining messages are diverted via a special communications channel 360 to at least one message processor 330.

The message processor 330 receives the diverted messages from the message manager 320. The message processor 330 may include: a user interface to receive inbound message requirements, a computer processor, and a computer-readable medium to store the inbound message requirements. The message processor 330 issues to the central base station controller 112, via the message manager 320, inbound multicast message requests to schedule the inbound multicast message group transmissions. The message processor 330 also compares the diverted messages received from the message manager 320 with the messages requested. If any inbound messages are not properly received, the message processor issues a new inbound transmission request.

Figure 4:
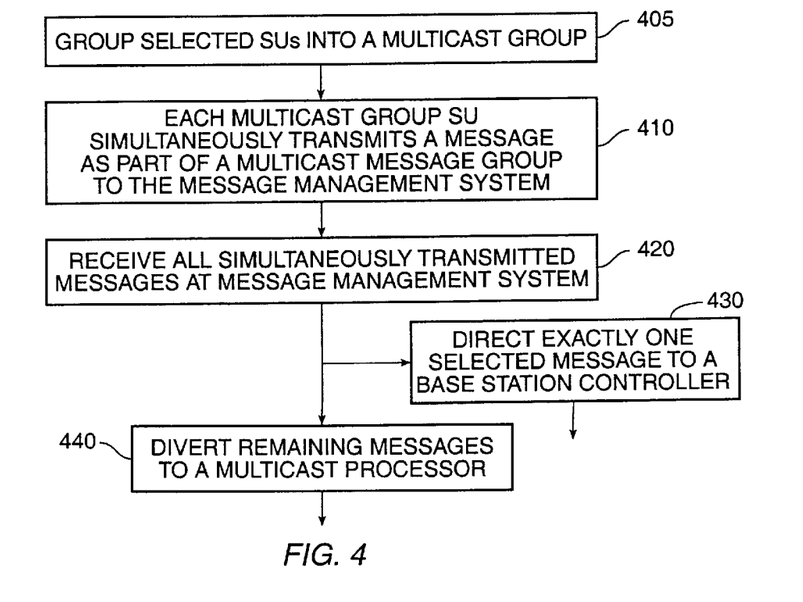
FIG. 4 depicts a flowchart describing steps of increasing inbound message traffic to a central base station, in accordance with a specific embodiment of the present invention.

The functions of both the message manager 320 and message processors 330 are more fully explained below with reference to FIGS. 4–8. FIG. 4 depicts a flowchart describing steps of increasing inbound message traffic to a central base station 104, in accordance with a specific embodiment of the present invention. At step 405, the SUs 106 within a particular simulcast area 102 are selected for grouping into a multicast group 120. Upon command from the central base station 104, at step 405 each SU 106 within the multicast group 120 simultaneously transmits a message. The simultaneously transmitted messages make up a multicast message group, which is received at the message management system 310 at step 420. The message management system, at step 430, selects one message for directing to the central base station controller 112. At step 440, the remaining messages in the multicast message group are diverted to the multicast processor 330 that requested the multicast message group.

Figure 5:
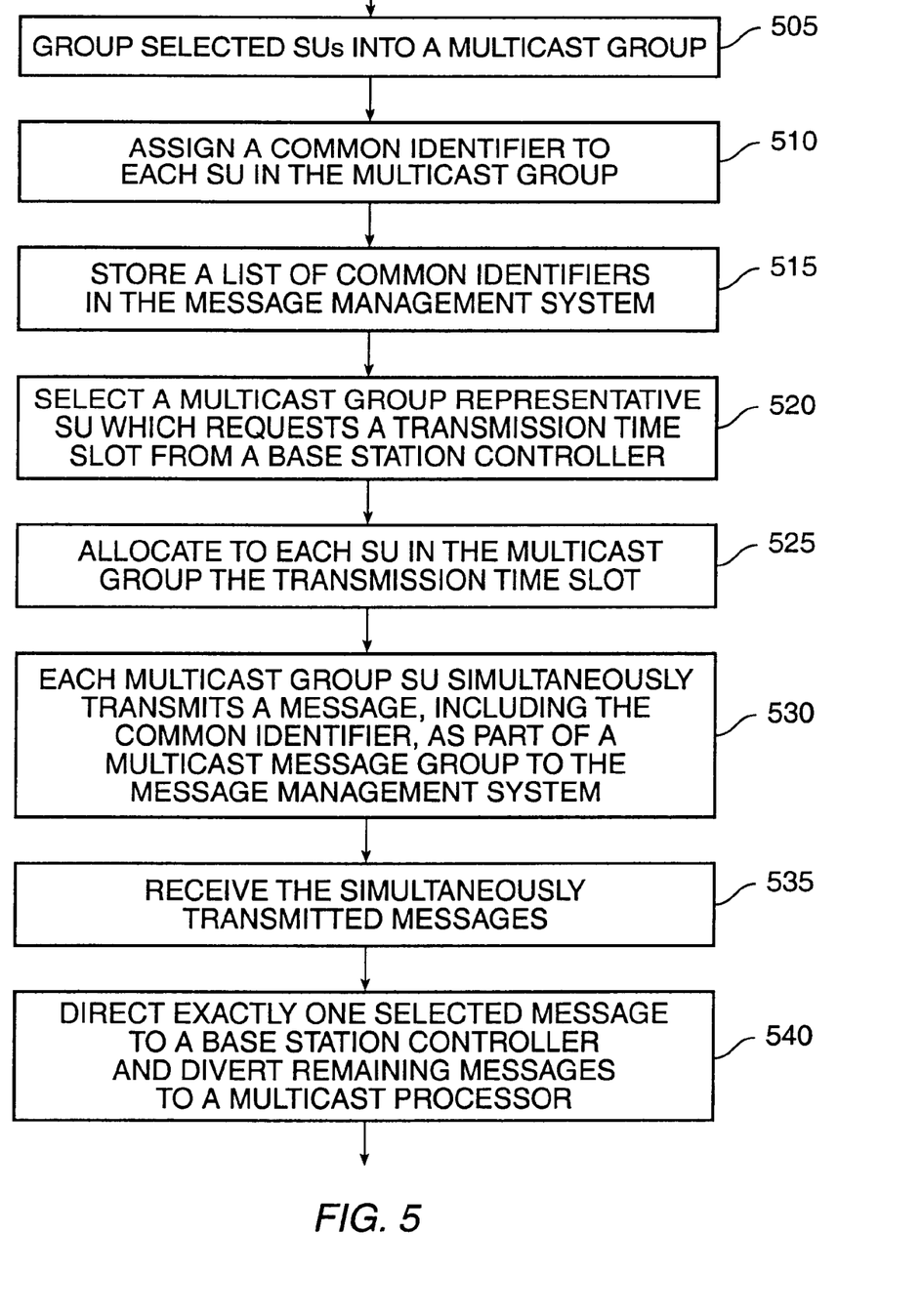
FIG. 5 depicts a flowchart describing additional steps of increasing inbound message traffic to the central base station, in accordance with an alternative embodiment of the present invention.

FIG. 5 depicts a flowchart in accordance with an alternative embodiment of the present invention and describing additional steps of increasing inbound message traffic to the central base station. After selected SUs 106 have been grouped into a multicast group 120, the base station network 300 assigns each SU a common identifier at step 510. The common identifier associates each SU to a particular multicast group. At step 515, the message management system stores a list of common identifiers, which define various multicast groups within a simulcast region 102. The list of common identifiers may be stored in the message manager 320, or alternatively in any of the message processors 330. The stored list of identifiers serves as a parameter with which to filter inbound messages. Steps 515 and 510 are interchangeable, and occur in the order depicted in FIG. 5 for example only.

Continuing with step 520, the message management system 320 selects one of the multicast group SUs as a "multicast group representative" 125 as shown in FIG. 1. The multicast group representative 125 requests the central base station controller 112 for a scheduled transmission time slot as if for a single SU inbound transmission. The multicast group representative 125 may be a remotely located SU 106, or may be integrated into the message management system 310 as, for example, a function in the message processor 330. Steps 520 and 525 may be omitted in the case where multicast group periodically sends an unsolicited multicast message group. Unsolicited inbound messages may be sent by a multicast group 120 that is preprogrammed for sending status report data on a scheduled or unscheduled basis. An example of an unscheduled status report may be where stationary SUs in vending machine report at a time when one machine is empty.

At step 525, the central base station controller 112 allocates to each SU in the multicast group 120 the requested transmission time slot. The allocation is based on the common identifier address given to each SU 106 in the multicast group 120, described above. In subsequent transmission time slot requests, step 510 may or may not be repeated.

With respect to step 530, each SU in the multicast group 120 transmits simultaneously, either upon command from the central base station controller 112, or upon the occurrence of a preprogrammed event. Each individual transmission may contain the common identifier in the message, or based on the FLEX$_{TM}$ address scheme. At step 535, the message management system 310 receives the simultaneously transmitted messages in the multicast message group, and performs the diversion task of step 540 as discussed above in steps 430 and 440, which will be described in further detail below.

Figure 6:
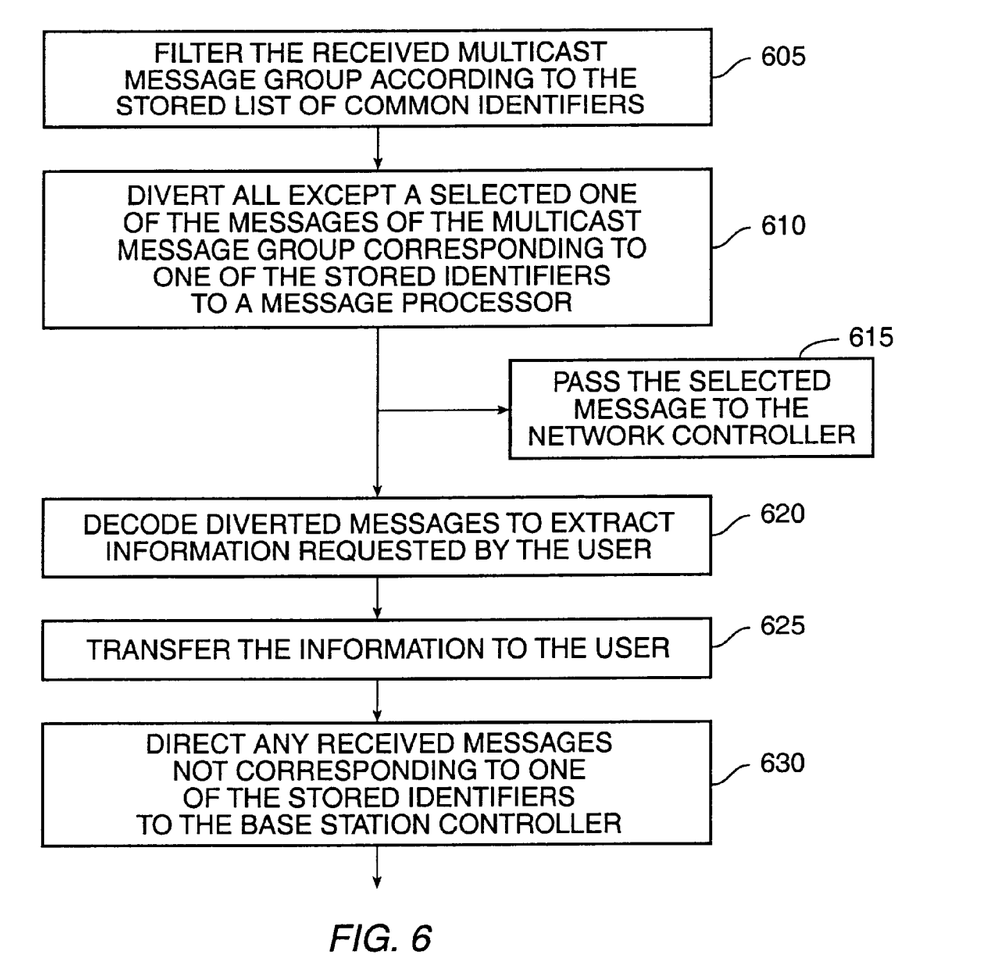
FIG. 6 depicts a flowchart describing additional steps of operating a message management system in accordance with one embodiment of the present invention.

FIG. 6 depicts a flowchart describing additional steps of operating a message management system 310 in accordance with one embodiment of the present invention. At step 605, the message management system 310 filters the received multicast message group according to the stored list of common identifiers. Filtering is usually performed by the message manager 320, which compares the received multicast message group's identifier with the stored list of identifiers, and performs the following functions: messages not corresponding to the stored list of identifiers are passed, unmodified, to the central base station controller 112 at step 615; for those messages that correspond to a stored identifier, all but one selected message are diverted to the message processor 330; messages belonging to the multicast group representative 125 are passed on to the central base station controller 112 at step 615; and all other multicast message group 120 messages are diverted to the message processor 330.

At step 620, the message processor 330 decodes the diverted messages for their informational content. The information sent may be any type of reporting data requested by a user. At step 625, the information may be transferred to the user via the user interface in the message processor 330. Finally, at step 630, the message processor 330 compares the received messages with the informational requirements of the user, which may be stored in a memory. In the event that not all messages from the multicast message group are properly received, the message processor 330 will request a retransmission of the multicast message group.

Figure 7:
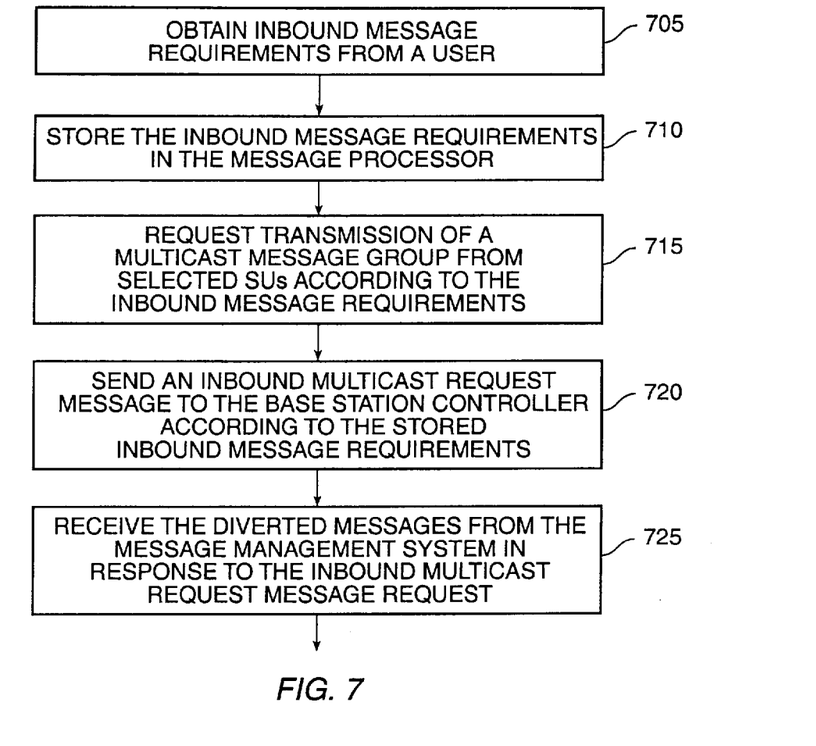
FIG. 7 depicts a flowchart describing steps of operating a message processor according to an alternate embodiment of the present invention.

FIG. 7 depicts a flowchart describing steps of operating a message processor 330 according to an alternate embodiment of the present invention. The message processor 330 may have a user interface from which it could obtain inbound message requirements from a user, in step 705. The types of inbound message requirements may include, but is not limited to: a schedule of multicast groups 120 from which a user needs status reports; a list of numerical data required from particular SUs 106 within a multicast group 120; and unsolicited entries from a credit card verification system. The examples herein are not intended to limit the scope of the invention, but are provided as merely an example of user requirements in a two-way pager system having high inbound capacity. The user requirements are stored in a memory of the message processor 330.

At step 715, the message processor 330 requests an inbound transmission from the multicast group 120. This may be accomplished by the message processor 330 sending to the central base station controller 112, via the message manager 320, an inbound multicast request message. The inbound multicast request message requests the central base station controller 112 to schedule a time slot for the multicast transmission, and further command the SUs in the multicast group 120 to send their simultaneous inbound messages. Based upon the inbound multicast message request, the message management system 310 will receive the multicast message group as previously described, and the message processor 330 will, in turn, receive the diverted messages in step 725.

Figure 8:
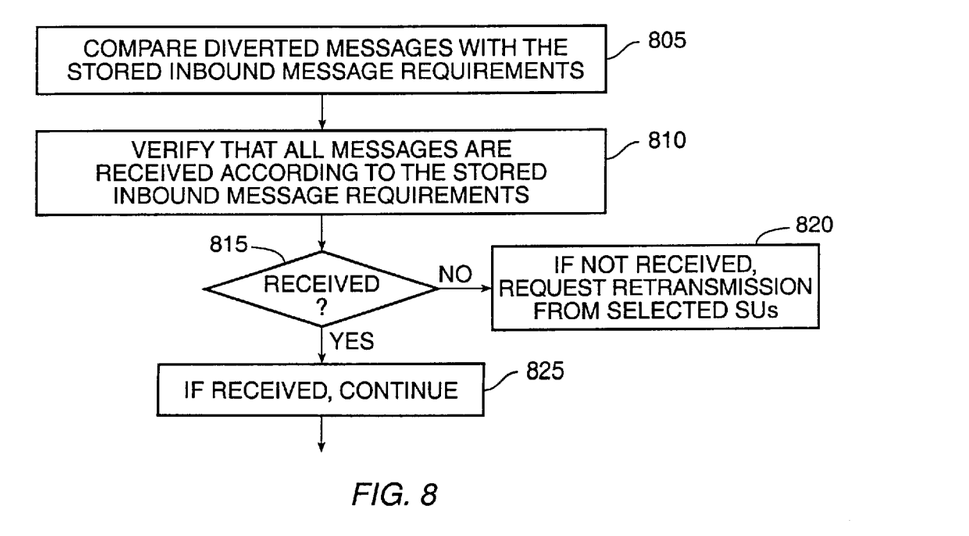
FIG. 8 depicts a flowchart describing additional steps of operating a message processor according to an alternate embodiment of the present invention.

FIG. 8 depicts a flowchart describing additional steps of operating a message processor according to an alternate embodiment of the present invention. Upon receipt of the diverted messages from step 725, at step 805 the message processor 330 compares the diverted messages with the user's inbound message requirements stored in a memory. At step 810, the message processor 330 verifies whether all messages requested are received. If the messages, or their informational content, were not properly received, the message processor 330 may request a retransmission, beginning again with step 710 of FIG. 7. If the messages are properly received, the message processor 330 will continue with step 625, described above.

In the foregoing specification, the invention has been described with reference to specific exemplary embodiments thereof. It will, however, be evident that various modifications and changes may be made there unto without departing from the broader spirit and scope of the invention as set forth in the appended claims and their full scope of equivalents.

What is claimed is:

1. In a two-way pager network wherein a central base station receives inbound messages from a plurality of subscriber units via a plurality of receiver sites, and wherein a central base station controller is adapted for receiving only one inbound message from a selected subscriber unit during each one of a plurality of inbound transmission time slots, a method for increasing inbound message traffic to said central base station, comprising:

providing a message management system between said plurality of receiver sites and said central base station controller;

grouping selected ones of the plurality of subscriber units into a multicast group for simultaneously transmitting messages to said message management system, said simultaneously transmitted messages making up a multicast message group;

receiving, at the plurality of receiver sites coupled to the message management system, said simultaneously transmitted messages of said multicast message group;

directing exactly one selected message of said multicast message group to said central base station controller; and diverting remaining messages of said multicast message group to a message processor.

2. The method of claim 1 further comprising:

selecting a group representative subscriber unit from said multicast group for requesting a transmission time slot from the central base station controller; and allocating to each subscriber unit in said multicast group the transmission time slot.

3. The method of claim 1 further comprising:

assigning to each subscriber unit in said multicast group a common identifier from a plurality of multicast group identifiers, said common identifier being transmitted with each simultaneously transmitted message of said multicast message group; and storing said plurality of multicast group identifiers in the message management system.

4. The method of claim 3 further comprising:

filtering said received multicast message group according to said stored identifiers;

diverting to a message processor all but exactly one selected message of said multicast messages group which correspond to one of said stored identifiers; and directing any received messages not corresponding to one of said stored identifiers to the central base station controller.

5. The method of claim 4 wherein the step of diverting to a message processor further comprises:

decoding said diverted messages for information requested by a user; and transferring said information to the user.

6. The method of claim 1 further comprising:

obtaining inbound message requirements from a user;

storing said inbound message requirements in the message processor; and requesting said simultaneously transmitted messages from selected ones of said plurality of subscriber units according to said inbound message requirements.

7. The method of claim 6 wherein said step of requesting further comprises:

sending an inbound multicast request message to the central base station controller according to said inbound message requirements; and receiving, in response to the inbound multicast request message, the diverted messages from the message management system.

8. The method of claim 6 wherein said multicast processor compares said diverted messages with said stored inbound message requirements.

9. The method of claim 8 further comprising:

verifying that all messages are received according to said stored inbound message requirements; and requesting said selected ones of the plurality of subscriber units to retransmit if not all messages correspond to said inbound message requirements.

10. The method of claim 1 wherein said messages are transmitted in accordance with a protocol belonging to the FLEX$_{TM}$ family wherein a transmission cycle is divided into a plurality of frames.

11. In a two way pager network wherein a central base station receives inbound messages from a plurality of subscriber units via a plurality of receivers, and wherein a central base station controller is adapted for receiving only one message from a selected subscriber unit during each one of a plurality of inbound transmission time slots, a device for increasing message traffic to said central base station, the device being operably coupled between said plurality of receivers and said central base station controller, comprising:

a message manager including a computer coupled to said plurality of receivers and a plurality of transmitters, to group selected ones of said subscriber units into a multicast group for simultaneously transmitting messages to said central base station, to direct exactly one selected message of said multicast message group to said central base station controller, and to divert remaining messages of said multicast message group; and at least one message processor, coupled to said message manager, to receive said remaining messages.

12. In a two-way pager network wherein a central base station receives, in accordance with a user's requirements, inbound messages from a plurality of subscriber units via a plurality of receiver sites, and wherein a central base station controller is adapted for receiving only one inbound message from a selected subscriber unit during each one of a plurality of inbound transmission time slots, a message management system operably coupled between said plurality of receiver sites and said central base station controller for increasing inbound message traffic to said central base station, said system comprising:

a message manager to group selected ones the plurality of subscriber units into a multicast group for simultaneously transmitting messages, said simultaneously transmitting messages making up a multicast message group, said message manager further comprising;

a plurality of first communication channels to receive said multicast message group;

a second communication channel coupled to said central base station controller;

a filter to direct exactly one selected message of said multicast message group to said central base station controller via said second communication channel; and at least one of a third communication channel for passing remaining messages of said multicast group;

a message processor coupled to each one of said third communication channels, to receive and process said remaining messages.

13. The message management system of claim 12, wherein the message processor further includes:

a user interface to receive inbound message requirements from a user;

a computer processor coupled to said user interface; and a computer-readable medium coupled to said computer processor including:
code that stores said inbound message requirements;
code that directs said computer processor to request said multicast message group according to said inbound message requirements; and
code that directs the first processor to compare said received remaining messages with said requested multicast message group.

14. The message management system of claim 13, wherein the message manager also includes:

a second computer processor coupled to said at least one third communication channel;

a second computer-readable medium coupled to said second processor including:
code that directs said second processor to select one message of said multicast message group for passing to said central base station controller;
code that directs said second processor to filter remaining messages according to said inbound message requirements; and
code that directs said second processor to divert to said message processor remaining messages of said multicast messages.

15. The message management system of claim 12 wherein said central base station operates in accordance with a protocol belonging to the FLEX$_{TM}$ family, wherein a transmission cycle is divided into a plurality of frames.

* * * * *